(12) United States Patent
Hillis et al.

(10) Patent No.: US 7,434,059 B2
(45) Date of Patent: Oct. 7, 2008

(54) INTERACTIVE, PERFORMANCE BASED AUTHENTICATION

(75) Inventors: W. Daniel Hillis, Encino, CA (US); Bran Ferren, Beverly Hills, CA (US)

(73) Assignee: Searete LLC, Bellevue, WA (US)

( * ) Notice: Subject to any disclaimer, the term of this patent is extended or adjusted under 35 U.S.C. 154(b) by 697 days.

(21) Appl. No.: 10/327,340

(22) Filed: Dec. 20, 2002

(65) Prior Publication Data
US 2003/0126471 A1 Jul. 3, 2003

(51) Int. Cl.
*G06F 1/24* (2006.01)
(52) U.S. Cl. .................. 713/182; 713/189; 713/193
(58) Field of Classification Search .............. 713/182, 713/189, 193
See application file for complete search history.

(56) References Cited

U.S. PATENT DOCUMENTS

| | | | | |
|---|---|---|---|---|
| 4,675,828 A | * | 6/1987 | Winston | ............ 700/286 |
| 4,901,223 A | * | 2/1990 | Rhyne | ............ 345/475 |
| 4,982,324 A | * | 1/1991 | McConaughy et al. | ...... 709/222 |

* cited by examiner

Primary Examiner—Thomas R. Peeso

(57) ABSTRACT

A method and apparatus is provided for authenticating a candidate user of a microprocessor based system by using performance measures obtained through monitoring the behavior of the candidate user as he participates in an interactive procedure. The candidate user is authenticated if the performance measures compare favorably with predetermined requisite performance measures. The performance of an authorized user during the interactive procedure, as judged by the performance measures, must be reliably repeatable. The requisite performance measures are effectively disguised from the user and any potential onlookers, at once ensuring the integrity of the authentication method against sharing, eavesdropping, and coercion. In essence, the interactive procedure must elicit consistent performance from an authorized user, but in a manner that is not easily described or even understood by the authorized user or any onlookers. In the presently preferred embodiment of the invention, these characteristics are achieved by constructing an interactive procedure in a progressively combinatorial complex manner, training an authorized user to perform acceptably at each stage of increasing complexity.

44 Claims, 3 Drawing Sheets

INTERACTIVE, PERFORMANCE BASED AUTHENTICATION

BACKGROUND OF THE INVENTION

1. Technical Field

The invention relates to authenticating a candidate user of a microprocessor based system. More particularly, the invention relates to interactive, performance based authentication.

2. Description of the Prior Art

In many instances, the designer of a microprocessor based system may wish to restrict access to system resources to authorized users only. Accordingly, a great number of methods have been devised for authenticating the identity of a potential user of microprocessor based systems.

Commonplace are systems that require a user to provide a valid alphanumeric password prior to allowing access to system resources. Desktop computers, automatic bank teller machines, and Internet based shopping accounts are just a few examples of system resources that are protected by passwords.

For several reasons, such passwords are not always effective in authenticating the identity of the user. First, alphanumeric passwords are easily shared, in a cooperative manner, between many users. Secondly, the alphanumeric nature of the passwords ensures that they are easily and succinctly expressed, and are therefore convenient targets of theft. This problem is compounded by the fact that alphanumeric passwords, particularly those not subject to dictionary based attacks, are usually difficult to remember and are often written down by authorized users. Third, such passwords may be obtained by unauthorized persons via eavesdropping, e.g. monitoring of physical keystrokes on a numeric keypad or computer keyboard, or monitoring of transmissions across a network. Finally, an alphanumeric password is easily coerced from an authorized user if the user is placed under duress.

Biometric identification systems have been proposed and implemented to address many of these shortcomings. Known systems, such as the Infineon FingerTIP™ and Biotouch Identix™, identify an individual based on the individual's fingerprint patterns. Such finger scanning systems analyze a fingerprint pattern to find distinctive minutiae, e.g. discontinuities that interrupt the ridge patterns of a fingerprint. The nature and location of the minutiae are noted, thus creating a record uniquely associated with the scanned fingerprint. Techniques have also been developed to identify individuals based on the shape and pattern of an entire hand.

There are also several technologies that identify a user based on the patterns within an individual's eye. Such eye sensors record and analyze patterns within the subject's iris or retina. Iris scanners, such as the IriScan™ system offered by Iridian, Inc., are both reliable and convenient. Retinal scanners such as the ICam 2001™ manufactured by EyeDentify, while more intrusive and typically requiring a more cooperative subject, offer increased reliability.

Biometric identification does possess several appealing characteristics. The authentication process is potentially very accurate, and biometric information is inherently non-transferable from one user to another. However, biometric identification equipment is typically expensive, and typically is of little use during ordinary system operation after successful authentication. Furthermore, many users find the actual biometric identification process invasive or unpleasant.

It would be advantageous to provide a user authentication technique that is both accurate and reliable, but not shareable, subject to theft, observable through eavesdropping, or extractable through coercion. Furthermore, it would be advantageous to provide such a technique that is implementable with a minimum amount of additional equipment beyond that already present in a typical system that requires user authentication, and that therefore entails minimal additional cost and effort. Finally, the authentication process should be noninvasive and pleasant, perhaps even enjoyable, for the user.

SUMMARY OF THE INVENTION

The invention provides a method and apparatus for authenticating a candidate user of a microprocessor based system by using performance measures obtained through monitoring the behavior of the candidate user as he participates in an interactive procedure. The candidate user is authenticated if the performance measures compare favorably with predetermined requisite performance measures.

The performance of an authorized user during the interactive procedure, as judged by the performance measures, is reliably repeatable. Furthermore, the requisite performance measures are effectively disguised from the user and any potential onlookers, at once ensuring the integrity of the authentication method against sharing, eavesdropping, and coercion. The interactive procedure elicits consistent performance from an authorized user, but in a manner that is not easily described or even understood by the authorized user or any onlookers.

In the presently preferred embodiment of the invention, the requisite performance measures are developed by constructing an interactive procedure in a progressively combinatorial complex manner, training an authorized user to perform acceptably at each stage of increasing complexity.

DETAILED DESCRIPTION OF THE INVENTION

Figure 1:
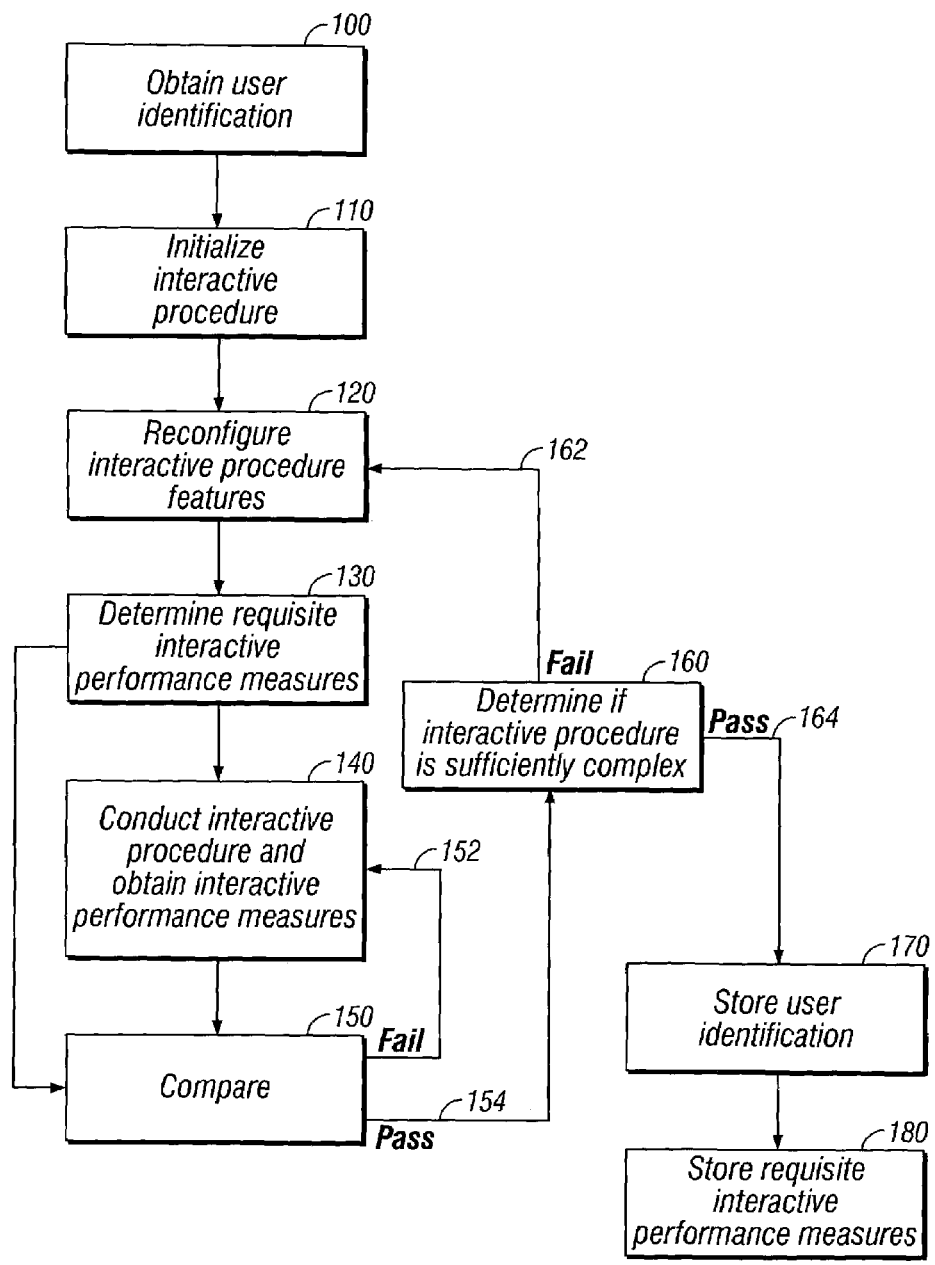
FIG. 1 is a flow diagram showing a process that may be used to establish new authorized users of system resources or that may be used to change the authentication process for an existing user according to the invention.

The herein disclosed authentication technique is best understood by considering the preferred embodiment of the invention, in which the interactive procedure is a game, for example a comparatively simple video game. Authentication is based on the ability of the candidate user to play a game as required by the requisite performance measures. A training process ensures that the authorized user is the only individual who can properly play a game developed uniquely for the authorized user. The complexity of the game ensures that the authorized user cannot precisely identify the requisite performance characteristics that constitute playing the game successfully, and therefore cannot relate this information to unauthorized users.

As a specific example, the training process for a video game may begin with a pair of symbols presented on a computer display. The requisite performance measures may dictate that the user move the first symbol, for example an "X", using a set of keyboard, mouse, or joystick controls, to track the second symbol, for example an "O." The user must then maintain the alignment of the two symbols as the target symbol is moved in a random manner about the display. The requisite performance measures require that the alignment be maintained within a specific tolerance, for example a predetermined distance in pixels between object centers, for a specific duration of time.

Once the authorized user has mastered this simple form of the game, additional symbols are added. It may then be required that the user control the first symbol so as to avoid the newly added symbols. Subsequent reconfigurations may alter the color or size of the symbols. Further, the color and size of the symbols may be varied within a single reconfiguration. The physical properties of the objects represented by the symbols may also be altered. For example the "X" may be given a sense of inertia so that it responds more slowly to control actions of the user. Velocities and accelerations of a patterned nature may also be superimposed on the user control actions.

Many other game features may be added, removed, or modified. These features may be classified into the following categories:

Symbol Properties. The number, size, shape, and color of the symbols presented on the display may be varied.

Control characteristics. The means by which the user controls the symbols on the display may be varied. Variations in keyboard, mouse, or joystick control mappings and the actuation force associated with these controls are possible.

Object Physics. The physical properties of the objects represented by the displayed symbols, such as mass, rotational moments, charge, and roughness, may be varied. The physics of the world surrounding the objects may also be altered. Force fields, e.g. gravitational or electromagnetic, and frictional behaviors may be incorporated.

Goals. The tasks required of the user to obtain the requisite performance measures, such as symbol alignment, symbol avoidance, symbol capture, and symbol navigation patterns. The performance measures may be based on a series of goals or a set of coincident goals.

Ending Characteristics. The state in which the game is terminated may be varied.

Variations with State. Any of the above characteristics may vary based on the current state of the game. The game state may include an elapsed time, a remaining time, object positions, or performance history. The current state may also be a function of previous states.

The game variations that may be obtained using these features and other similar features are extremely numerous. To the trained user, the reconfigurations of the initial game are easily manageable, due to the progressive nature of the training process. To the untrained user, the interactions between the successive reconfigurations provide hopeless distraction away from the underlying requisite performance measures.

More generally, the role of the game in the preferred embodiment may be fulfilled by any interactive procedure in which the user may participate. The interactive procedure may be based on multimedia devices offering audible, visual, and tactile interaction with the user.

FIG. 1 is a flow diagram showing a process that may be used to establish new authorized users of system resources or that may be used to change the authentication process for an existing user according to the invention.

The process begins by obtaining user identification (100) for the authorized user. This is most simply done through the entry of a username. Alternatively, electronic or magnetic identification devices may also be employed. Finally, although less preferable due to their intrusive nature, biometric techniques such as those found in the prior art may also be used.

Once the authorized user is identified, the training process begins with the initialization of the interactive procedure (110). This may be accomplished by creating an initial null interactive procedure containing no features, or by beginning with a standardized, simple interactive procedure.

The features of this initial procedure are then reconfigured (120). The details of this operation are discussed subsequently, but the principal function of this operation is to increase the complexity of the interactive procedure.

Based on the reconfigured features of the interactive procedure, appropriate requisite interactive performance measures are then determined (130). The requisite performance measures, if achieved by the user, are sufficient to provide user authentication. The performance measures may preferably correspond to the user achieving a specific goal or completing a specific task, within certain numerical tolerances, within a certain period of time.

For example, the requisite performance measures may specify an absolute position, velocity, or acceleration of a user controlled symbol. The position, velocity, or acceleration of a user controlled symbol relative to one or more other symbols may also be specified. Further, the performance measures may require that any of the above requirements be achieved within a specific time or maintained for a specific duration.

Having determined a set of appropriate requisite performance measures, the interactive procedure is conducted (140) and actual performance measures are obtained. For example, the performance measures may be obtained by logging the position, velocity and acceleration of the user controlled symbols and other symbols during the course of the interactive procedure. The actual performance measures are then compared with the requisite performance measures.

More specifically, the actual performance measures can be compared with a distribution of previously observed performance measures that is delineated into acceptable and unacceptable performances. The requisite performance measures specify that the actual performance measures must fall within the acceptable region of the performance distribution. For example, in an interactive procedure where the requisite performance measure requires that a user track a target symbol with a user controlled symbol, the time-averaged separation of the two symbols over the duration of the procedure is computed. The time-averaged separation is then compared with a distribution of such time-averaged separations observed previously. If the time-averaged separation is less than one standard deviation from the mean of the distribution, the performance is judged acceptable. This procedure is easily extended to an interactive procedure incorporating multiple performance measures.

If the actual performance measures compare (150) favorably with the requisite performance measures, the training user is judged to have successfully mastered (154) the interactive procedure at its current level of complexity. If the actual performance measures do not compare favorably (152) with the requisite performance measures, the interactive procedure is repeated until mastery is obtained.

Once mastered, the interactive procedure is analyzed to determine if it is sufficiently complex (160). If it is not sufficiently complex (162), the procedure is reconfigured (120) for greater complexity by incorporating new features, and the mastery process is repeated. If the interactive procedure is determined to be of sufficient complexity (164), the obtained user identification is stored (170), and the requisite interactive performance measures associated with the final interactive procedure are stored (180).

One method of determining if the procedure is sufficiently complex is to consider the ease with which the user is able to master the newly reconfigured procedure. If after a single attempt the user is able to master the interactive procedure, it is determined to be insufficiently complex. If, however, a user is unable to master the interactive procedure after several repeated attempts, the prior configuration may be selected as the sufficiently complex interactive procedure.

Figure 2:
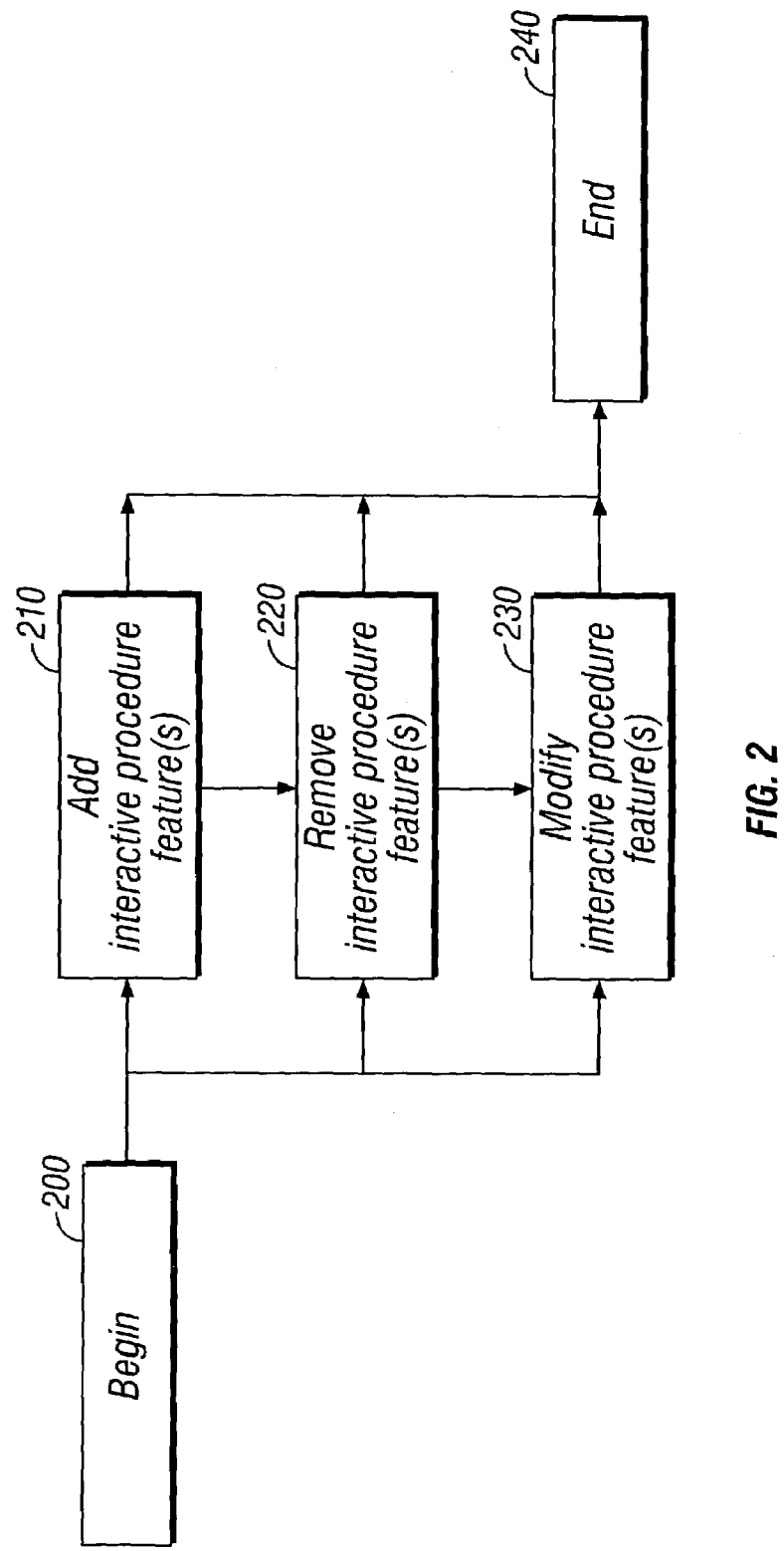
FIG. 2 is a flow diagram showing a process for reconfiguring an interactive procedure by the addition, removal, or modification of features according to the invention.

FIG. 2 is a flow diagram showing a process for reconfiguring an interactive procedure by the addition, removal, or modification of features according to the invention. In preferred embodiment of the invention, once this procedure begins (200) new features such as those described previously, may be added (210), removed (220), or modified (230). Thereafter, the procedure for a current reconfiguration ends (240). With each reconfiguration, the complexity of the interactive procedure is thus increased in a combinatorial fashion.

In this manner, the authorized user learns an acceptable pattern of performance in an increasingly complex interactive procedure. Initially, it may be clear to the training authorized user which specific performance characteristics are needed to achieve acceptable performance measures. At this stage in the training process, it is possible for the authorized user to relate to an unauthorized user a set of interactive behaviors that are sufficient to achieve authorization. However, the interactive procedure eventually becomes complex enough that the trained user is not able to enumerate, describe, or explain the specific characteristic of his performance that result in acceptable performance measures.

Once a user is trained to perform adequately in a sufficiently complex interactive procedure, he may be reliably authenticated at a subsequent time.

Figure 3:
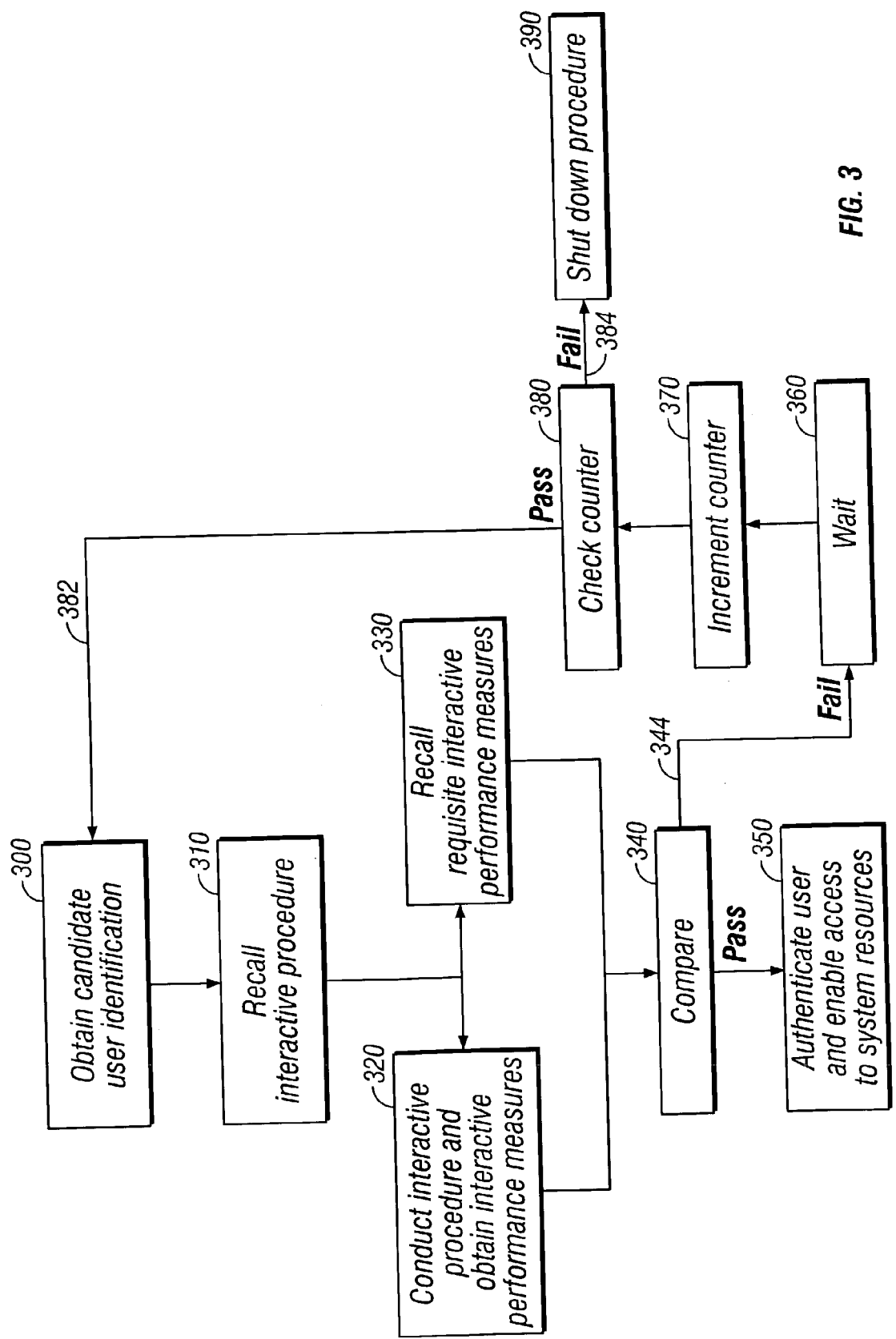
FIG. 3 is a flow diagram showing a process for authenticating a candidate user according to the invention.

FIG. 3 is a flow diagram showing a process for authenticating a candidate user according to the invention. The process begins by obtaining identification from the candidate user (300). This may be accomplished through any of the techniques described in the description of the training procedure.

Based on the candidate user identification, the final interactive procedure and the corresponding requisite interactive performance measures are recalled (310). The interactive procedure is then conducted (320) and actual interactive performance measures are obtained as described previously.

Then, the actual performance measures are compared (340) with the requisite performance measures (330). If the actual performance measures compare favorably (342) with the requisite performance measures, the candidate user is authenticated (350) as an authorized user, and access to system resources is enabled. If the actual performance measures do not compare favorably (344) with the requisite performance measures, a delay ensues (360), and a counter is incremented (370).

The counter is then checked (380) against a number of maximum allowable authentication attempts. If the counter is less than the number of maximum allowable authentication attempts (382), the authentication process is repeated (300). If the maximum number of allowable attempts is exceeded (384), the system begins a shut down procedure (390). This may correspond to an extended delay or a permanent disabling of system functionality.

Because the final interactive procedure is constructed in a combinatorial manner, the number of possible interactive procedures is very large. It is therefore relatively easy to ensure that a particular interactive procedure is unique to an individual authorized user. Moreover, the combinatorial nature of the interactive procedure ensures that the casual performance of an unauthorized and untrained user is extremely unlikely to compare favorably with the requisite performance measures.

Further, the identification of the user during the authentication process may be incorporated into the interactive procedure itself. In this case, a single complex game is presented to all candidate users. Associated with the universal interactive procedure are a family of valid requisite performance measures. Each member within the family of valid requisite performance measures reflects the style and strategy of game play exhibited by a particular authorized user, for example the rapidity with which a user responds to alterations in game physics, or the accuracy with which the user tracks a target symbol undergoing a specific motion. If the candidate user performs in a manner comparing favorably with one member of the family of valid requisite performance measures, the user is authenticated. The identity of the user is determined based on the particular member of the family of valid requisite performance measures upon which authentication was granted.

In summary, the invention provides a reliable method of authenticating a candidate user. The method is likely implementable with the existing hardware of many microprocessor based systems. Finally, the method is nonintrusive to the user, and perhaps even fun and enjoyable.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. An authentication method, comprising the steps of:
developing at least one performance measure via a training process that ensures that an authorized user is the only individual who can properly provide said performance measure; and
assessing a user's performance of said at least one performance measure using an interactive procedure having at least one feature to determine if said user is an authorized user;
wherein the complexity of said performance measure ensures that an authorized user cannot precisely identify performance characteristics that constitute successfully performing said performance measure; and
wherein an authorized user cannot relate information about said performance characteristics that constitute successfully performing said performance measure to unauthorized users.

2. The method of claim 1, wherein said interactive procedure is a game; and wherein authentication is based on the ability of a candidate user to play said game, as required by said at least one performance measure.

3. The method of claim 2, wherein to a trained user, reconfigurations of an initial game are easily manageable, due to a progressive nature of said training process; and wherein to an untrained user, interactions between successive reconfigurations provide distraction from said requisite performance measures.

4. The method of claim 2, wherein a role of said game is fulfilled by any interactive procedure in which said user may participate.

5. The method of claim 4, wherein said interactive procedure is based on multimedia devices which comprise any of audible, visual, and tactile interaction with said user.

6. The method of claim 2, wherein said training process for said game begins with at least two symbols presented on a display; wherein said performance measures dictate that an authorized user position a first symbol, using a set of controls, in a specific alignment relative to at least a second symbol; and wherein said user must then maintain said alignment, within a specific tolerance, for a specific duration of time.

7. The method of claim 6, wherein once an authorized user has mastered a simple form of said game, more symbols are added.

8. The method of claim 7, wherein said user must control said first symbol to avoid newly added symbols.

9. The method of claim 7, wherein subsequent reconfigurations of said game change any of color and size of said symbols.

10. The method of claim 1, wherein at least one feature of said interactive procedure may be any of added, removed, and modified.

11. The method of claim 1, wherein said at least one feature comprises any of the following:
symbol properties, wherein any of number, size, shape, and color of symbols presented on a display are varied.

12. The method of claim 1, wherein said at least one feature comprises:
control characteristics wherein said user controls symbols on a display via any of variations in control mapping and actuation force associated with said control.

13. The method of claim 1, wherein said at least one feature comprises:
object physics wherein physical properties of objects represented by displayed symbols, which optionally comprise any of mass, rotational moments, charge, and roughness, are varied; and wherein physics of a world surrounding said objects, which comprise any of force fields and frictional behaviors are optionally altered.

14. The method of claim 1, wherein said at least one feature comprises:
goals which comprise tasks required of said user to obtain requisite performance measures, which optionally comprise any of symbol alignment, symbol avoidance, symbol capture, and symbol navigation patterns; wherein performance measures are optionally based on any of a series of goals and a set of coincident goals.

15. The method of claim 1, wherein said at least one feature comprises:
ending characteristics wherein a state in which a performance is terminated is varied.

16. The method of claim 1, wherein said at least one feature comprises:
variations with state wherein any of said above characteristics vary based on a current state of a performance; wherein state optionally comprises any of an elapsed time, a remaining time, object positions, and performance history; and wherein current state is optionally a function of at least one previous state.

17. A method for any of establishing authorized users of system resources and for changing an authentication process for an existing user, comprising the steps of:
obtaining user identification for an authorized user;
once an authorized user is identified, beginning a training process by initializing an interactive procedure;
reconfiguring features of said initial procedure to increase the complexity of said interactive procedure;
based on said reconfigured features of said interactive procedure, determining appropriate requisite interactive performance measures;
wherein said requisite interactive performance measures, if achieved by said user, are sufficient to provide user authentication;
conducting said interactive procedure;
obtaining actual interactive performance measures;
comparing said actual interactive performance measures with said requisite performance measures;
wherein if said actual interactive performance measures compare favorably with said requisite interactive performance measures, a training user is judged to have successfully mastered said interactive procedure at its current level of complexity; and
wherein if actual interactive performance measures do not compare favorably with said requisite interactive performance measures, said interactive procedure is repeated until mastery is obtained; and
once mastered, analyzing said interactive procedure to determine if it is sufficiently complex;
wherein if said interactive procedure is not sufficiently complex, said interactive procedure is reconfigured for greater complexity, and said mastery process is repeated; and
wherein if said interactive procedure is determined to be of sufficient complexity, said user identification is stored and said requisite interactive performance measures associated with a final interactive procedure are stored.

18. The method of claim 17, further comprising the step of:
providing an interactive procedure that is reconfigured by any of addition, removal, and modification of features;
wherein with each reconfiguration, complexity of said interactive procedure is increased in a combinatorial fashion; and
wherein said interactive procedure becomes sufficiently complex that a trained user is not able to enumerate, describe, or explain a specific characteristic of his performance that results in acceptable interactive performance measures.

19. An authentication method, comprising the steps of:
obtaining identification from a candidate user;
recalling a final interactive procedure and at least one corresponding requisite interactive performance measure;
conducting an interactive procedure;
obtaining actual interactive performance measures;
comparing said actual interactive performance measures with said at least one requisite interactive performance measure;
wherein if said actual performance measures compare favorably with said at least one requisite interactive performance measure, a candidate user is authenticated as an authorized user, and access to an associated system is enabled; and
wherein if said actual performance measures do not compare favorably with said at least one requisite interactive performance measure, a delay ensues and a counter is incremented.

20. The method of claim 19, further comprising the step of:
checking said counter against a number of maximum allowable authentication attempts;
wherein if said counter is less than a number of maximum allowable authentication attempts, said authentication method is repeated; and
wherein if said maximum number of allowable attempts is exceeded, said system begins a shut down procedure, which optionally corresponds to any of an extended delay and a permanent disabling of said system.

21. The method of claim 19, wherein candidate user identification during said authentication method is incorporated into said interactive procedure itself.

22. The method of claim 21, wherein a single complex game is presented to all candidate users;
    wherein a family of requisite performance measures is associated with the universal interactive procedure;
    wherein if said candidate user performs in a manner comparing favorably with one member of said family of requisite performance measures, said user is authenticated; and
    wherein identity of said candidate user is determined based on a particular member of said requisite performance measures upon which authentication was granted.

23. An authentication apparatus, comprising:
    at least one interactive performance measure that is developed via a training process that ensures that an authorized user is the only individual who can properly provide said performance measure; and
    means for assessing a user's performance of said at least one performance measure using an interactive procedure having at least one feature to determine if said user is an authorized user;
    wherein the complexity of said performance measure ensures that an authorized user cannot precisely identify performance characteristics that constitute successfully performing said performance measure; and
    wherein an authorized user cannot relate information about said performance characteristics that constitute successfully performing said performance measure to unauthorized users.

24. The apparatus of claim 23, wherein said interactive procedure is a game; and wherein authentication is based on the ability of a candidate user to play said game, as required by said performance measures.

25. The apparatus of claim 24, wherein to a trained user, reconfigurations of an initial game are easily manageable, due to a progressive nature of said training process; and wherein to an untrained user, interactions between successive reconfigurations provide a distraction away from said requisite performance measures.

26. The apparatus of claim 24, wherein a role of said game is fulfilled by any interactive procedure in which said user may participate.

27. The apparatus of claim 26, wherein said interactive procedure is based on multimedia devices which comprise any of audible, visual, and tactile interaction with said user.

28. The apparatus of claim 24, wherein said training process for said game begins with at least two symbols presented on a display; wherein said performance measures dictate that an authorized user position a first symbol, using a set of controls, in a specific alignment relative to at least a second symbol; and wherein said user must then maintain said alignment, within a specific tolerance, for a specific duration of time.

29. The apparatus of claim 28, wherein once an authorized user has mastered a simple form of said game, more symbols are added.

30. The apparatus of claim 29, wherein said user must control said first symbol to avoid newly added symbols.

31. The apparatus of claim 29, wherein subsequent reconfigurations of said game change any of color and size of said symbols.

32. The apparatus of claim 23, wherein at least one feature of said performance measure may be any of added, removed, and modified.

33. The apparatus of claim 23, wherein said at least one feature comprises:
    symbol properties, wherein any of number, size, shape, and color of symbols presented on a display are varied.

34. The apparatus of claim 23, wherein said at least one feature comprises:
    control characteristics wherein said user controls symbols on a display via any of variations in control mapping and actuation force associated with said control.

35. The apparatus of claim 23, wherein said at least one feature comprises:
    object physics wherein physical properties of objects represented by displayed symbols, which optionally comprise any of mass, rotational moments, charge, and roughness, are varied; and wherein physics of a world surrounding said objects, which comprise any of force fields and frictional behaviors,m are optionally altered.

36. The apparatus of claim 23, wherein said at least one feature comprises:
    goals which comprise tasks required of said user to obtain requisite performance measures, which optionally comprise any of symbol alignment, symbol avoidance, symbol capture, and symbol navigation patterns; wherein performance measures are optionally based on any of a series of goals and a set of coincident goals.

37. The apparatus of claim 23, wherein said at least one feature comprises:
    ending characteristics wherein a state in which a performance is terminated is varied.

38. The apparatus of claim 23, wherein said at least one feature comprises:
    variations with state wherein any of said above characteristics vary based on a current state of a performance; wherein state optionally comprises any of an elapsed time, a remaining time, object positions, and performance history; and wherein current state is optionally a function of at least one previous state.

39. An apparatus for any of establishing new authorized users of system resources and for changing an authentication process for an existing user, comprising:
    means for obtaining user identification for an authorized user;
    a training process which is begun by initializing an interactive procedure, once an authorized user is identified;
    means for reconfiguring features of said initial procedure to increase the complexity of said interactive procedure;
    means for determining appropriate requisite interactive performance measures, based on said reconfigured features of said interactive procedure;
    wherein said requisite performance measures, if achieved by said user, are sufficient to provide user authentication;
    means for conducting said interactive procedure;
    means for obtaining actual performance measures;
    means for comparing said actual performance measures with said requisite performance measures;
    wherein if said actual performance measures compare favorably with said requisite performance measures, a training user is judged to have successfully mastered said interactive procedure at its current level of complexity; and
    wherein if actual performance measures do not compare favorably with said requisite performance measures, said interactive procedure is repeated until mastery is obtained; and
    means for analyzing said interactive procedure to determine if it is sufficiently complex, once it is mastered;

wherein if said interactive procedure is not sufficiently complex, said interactive procedure is reconfigured for greater complexity, and said mastery process is repeated; and wherein if said interactive procedure is determined to be of sufficient complexity, an obtained user identification is stored and said requisite interactive performance measures associated with a final iterative procedure are stored.

40. The apparatus of claim 39, further comprising:

an interactive procedure that is reconfigured by any of addition, removal, and modification of features;

wherein with each reconfiguration, complexity of said interactive procedure is increased in a combinatorial fashion; and wherein said interactive procedure becomes sufficiently complex that a trained user is not able to enumerate, describe, or explain a specific characteristic of his performance that results in acceptable performance measures.

41. An authentication apparatus, comprising:

means for obtaining identification from a candidate user;

a final interactive procedure and at least one corresponding requisite interactive performance measure;

an interactive procedure;

means for obtaining actual interactive performance measures;

means for comparing actual performance measures with said at least one requisite interactive performance measure;

wherein if said actual performance measures compare favorably with said at least one requisite performance measure, a candidate user is authenticated as an authorized user, and access to an associated system is enabled; and wherein if said actual performance measures do not compare favorably with said at least one requisite interactive performance measure, a delay ensues and a counter is incremented.

42. The apparatus of claim 41, further comprising:

means for checking said counter against a number of maximum allowable authentication attempts;

wherein if said counter is less than a number of maximum allowable authentication attempts, said authentication method is repeated; and wherein if said maximum number of allowable attempts is exceeded, said system begins a shut down procedure, which optionally corresponds to any of an extended delay and a permanent disabling of said system.

43. The apparatus of claim 41, wherein candidate user identification during said authentication method is incorporated into said interactive procedure itself.

44. The apparatus of claim 43, wherein a single complex game is presented to all candidate users;

wherein a family of requisite performance measures is associated with the universal interactive procedure;

wherein if said candidate user performs in a manner comparing favorably with one member of said family of requisite performance measures, said user is authenticated; and wherein identity of said candidate user is determined based on a particular member of said requisite performance measures upon which authentication was granted.

* * * * *

UNITED STATES PATENT AND TRADEMARK OFFICE
CERTIFICATE OF CORRECTION

| | | |
|---|---|---|
| PATENT NO. | : 7,434,059 B2 | Page 1 of 1 |
| APPLICATION NO. | : 10/327340 | |
| DATED | : October 7, 2008 | |
| INVENTOR(S) | : W. Daniel Hillis and Bran Ferren | |

It is certified that error appears in the above-identified patent and that said Letters Patent is hereby corrected as shown below:

In the Claims:

Column 10, line 17, claim 35: "fields and frictional behaviors,m are optionally altered." should read --fields and frictional behaviors, are optionally altered.--

Signed and Sealed this
Second Day of July, 2013

Teresa Stanek Rea
*Acting Director of the United States Patent and Trademark Office*